March 22, 1932.     O. BLAHUT     1,850,654
CHART HOLDER
Filed Oct. 23, 1930     2 Sheets-Sheet 1

INVENTOR.
Otto Blahut
BY
his ATTORNEY.

March 22, 1932.  O. BLAHUT  1,850,654
CHART HOLDER
Filed Oct. 23, 1930   2 Sheets-Sheet 2

INVENTOR.
Otto Blahut
ATTORNEY.

Patented Mar. 22, 1932

1,850,654

UNITED STATES PATENT OFFICE

OTTO BLAHUT, OF HIGH POINT, NORTH CAROLINA, ASSIGNOR OF ONE-HALF TO WILLIAM B. HALL, OF HIGH POINT, NORTH CAROLINA

CHART HOLDER

Application filed October 23, 1930. Serial No. 490,764.

The invention generally relates to chart displaying devices and while adapted for more general employment is particularly designed for use in connection with monotype machines in the use of which operators are called upon to change pica ems and points (printer's measure) into monotype keyboard measure and seeks to provide a structure and a mounting therefor in convenient position upon the monotype machine whereby the necessary individual scales are kept directly before the operator so that such changes may be made quickly and conveniently and with very little, if any, chance for error.

In its more detailed nature the invention resides in the provision of a casing having a longitudinal window, means for movably mounting a chart within the casing to enable display of selected portions only of the chart, and novel brackets in which the casing is removably mounted and which are shaped to present the displayed portion of the chart in the most convenient relation to the line of vision of the operator.

Another object of the invention is to provide a casing body shaped from a single sheet of metal to provide bottom, front and rear sides, and top flanges spaced to provide a longitudinal window opening.

Another object of the invention is to provide in a device of the character stated novel chart mounting devices removable from the casing as a unit.

Another object of the invention is to provide a casing having a longitudinal window and means within the casing to mount a chart and move said chart to display selected sections thereof including mounting blocks spaced chart shafts on which the respective ends of the chart are wound and which are rotatable in the blocks and an intermediate driver shaft extended beyond the casing for outside manipulation, all of said shafts being gear connected to cause the chart shafts to rotate in like direction as the driver shaft is rotated.

With these and other objects in view which will more fully appear, the nature of the invention will be more clearly understood by following the description, the appended claims, and the several views illustrated in the accompanying drawings.

In the drawings:—

Like reference numerals designate corresponding parts throughout the several figures of the drawings.

Figure 1:
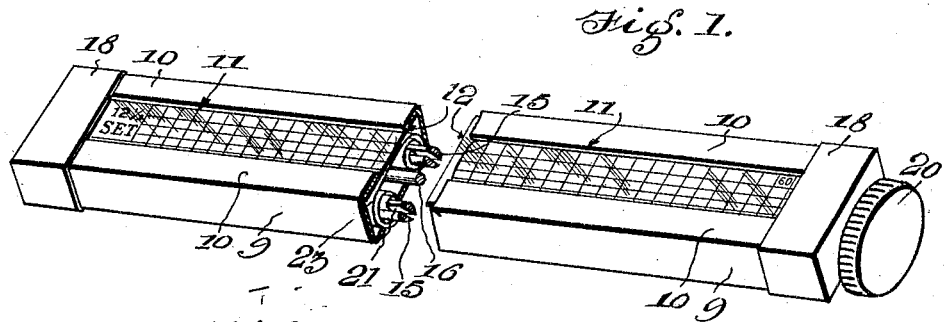
Figure 1 is a perspective view illustrating the device removed from its mounting, parts being broken away to show the chart within the casing.

In the drawings, I have disclosed my invention as particularly adapted for use on a monotype machine, it being mounted on the em rack where it may be readily viewed by the operator, together with the em scale which is supported by the em rack and the keyboard which is directly in advance of and below the em rack. While my invention is particularly adapted for this use, it should be understood that it may be employed for displaying other types of charts and might be mounted in various places.

In the drawings, 1 designates the em scale which is supported on the em rack 2, 3 designating the usual em rack slide screws which are employed in conveniently mounting the chart holder which forms the basis of my present invention.

Figure 3:
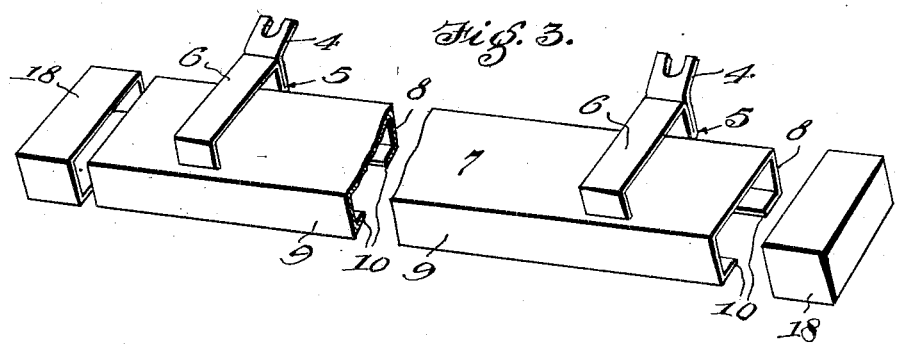
Figure 3 is an inverted perspective view of the casing and the mounting brackets.
Figure 4:
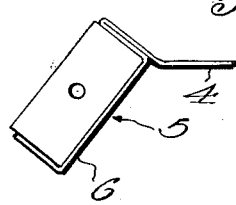
Figure 4 is an end elevation of the casing and bracket.

When employing my chart holder as above described, the screws 3 serve to secure to position the bifurcated ears 4 of bracket pieces 5 which are in the nature of metal strips bent U-shaped as at 6 to form holder receiving brackets, see Figures 3 and 4. From these figures, it will be observed that the bifurcated ears of the brackets and the main body or U-shaped portions bear angled relation so that when the ears are secured in horizontal position as illustrated in Figure 4 of the drawings, the body portions of the brackets will extend forwardly and downwardly so that the chart display face of the holder will be presented substantially at right angles to the line of vision of an operator of the monotype machine on which the holder is mounted.

The holder proper is preferably bent up from a single sheet of metal to provide a bottom 7, rear and front sides 8 and 9 respectively, and inwardly directed top flanges 10 which terminate short of the longitudinal center at the top face of the holder to provide a longitudinal window opening 11. In practice this window opening is protected by a transparent sheet 12.

I provide a chart mounting unit which is preferably mountable and removable as a unit with respect to said holder casing. The mounting unit comprises end blocks 13 of a size for snugly fitting within the ends of the casing and each of which is provided with three bearing bores 14 adapted to receive two outer chart shafts 15 and an intermediate driver shaft 16. Each of the shafts 15 and 16 carries a gear 17, the gears being intermeshed so that when the driver shaft 16 is rotated, the chart shafts 15 will be caused to rotate in like direction. The gears may be provided in duplicate sets at the respective ends of the shafts adjacent the blocks 13 or at one end only as desired.

Slip-over end caps 18 are provided to snugly encase the open ends of the holder casing and one of said caps is apertured to accommodate an extension 19 of the driver shaft 16, said extension being equipped with a turning knob 20 so that the driver shaft may be rotated from without the casing.

Figure 9:
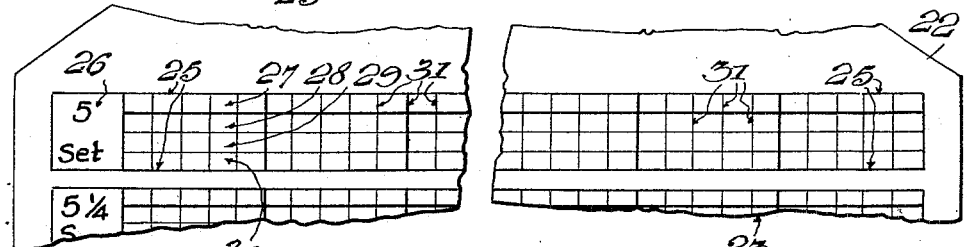
Figure 9 is a face view of a portion of the chart face.

Each chart shaft is equipped with a longitudinal slot 21 in which an end 22 of a chart 23 is secured as at 24. In this manner the portion of the chart to be displayed through the window opening 11 is stretched across and over the top faces of the shafts 15, the displayed face being varied at will by rotating the knob 20 to cause the respective ends of the chart to wind onto one shaft 15 and off the other shaft 15 according to the direction of rotation of said knob. By reference to Figure 9 of the drawings, it will be observed that the chart 23 is provided with horizontal lines 25 dividing it into a plurality of set size spaces 26, each of which is equivalent in width to the width of the window opening 11 so that no more than a single complete set size space may be displayed through the window at any given time.

Each set size space is subdivided by horizontal lines to provide four horizontal spaces, the first 27 of which is devoted to indications of pica ems, the second 28 to equivalent keyboard measures, the third 29 to equivalent key board measures in half picas, and the fourth 30 to equivalent keyboard measures in points. Vertical lines 31 are provided to subdivide the chart into separate sets of figures.

The utility of my improved chart and holder in converting pica ems and points (printer's measure) into monotype keyboard measures should be obvious. Under the usual practice cumbersome charts or tables have printed on opposite faces thereof the necessary information for converting the types. Obviously these charts are difficult to handle, become soiled and broken, and make it very easy for an operator to take readings from other than the proper set spaces and thus occasion errors. In my improved chart holder, only the correct set space is displayed and thus the chances for the operator to err are greatly reduced if not entirely eliminated. Furthermore, my improved holder positions the chart in such a convenient manner that the type conversions may be made with a minimum of effort and expenditure of time.

Figure 5:
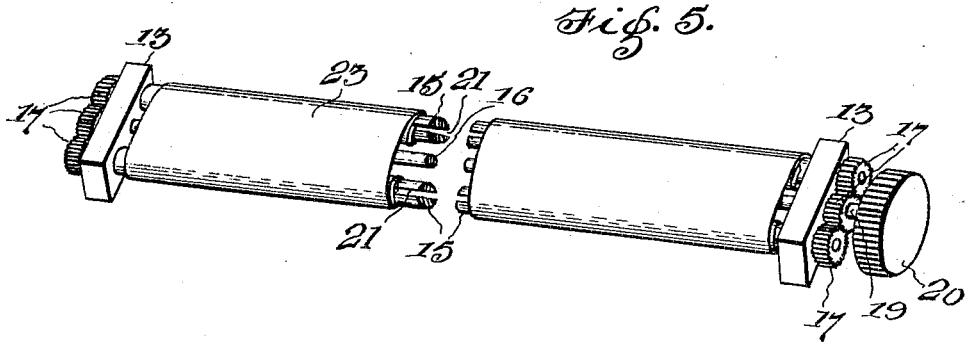
Figure 5 is a detail perspective view of the chart mounting and moving unit.
Figures 6, 7:
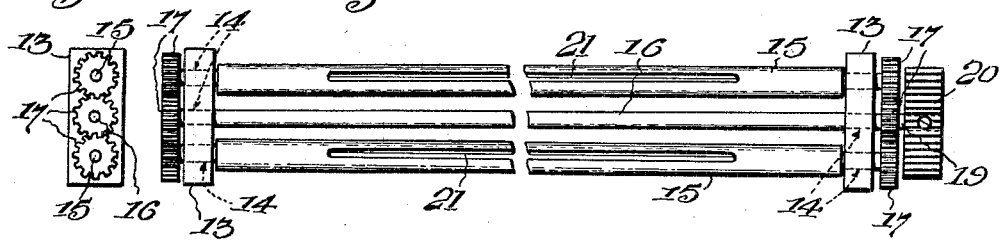
Figure 6 is a plan view of the chart mounting and moving unit, the chart being removed.
Figure 7 is an end view of the parts shown in Figure 6.
Figure 8:
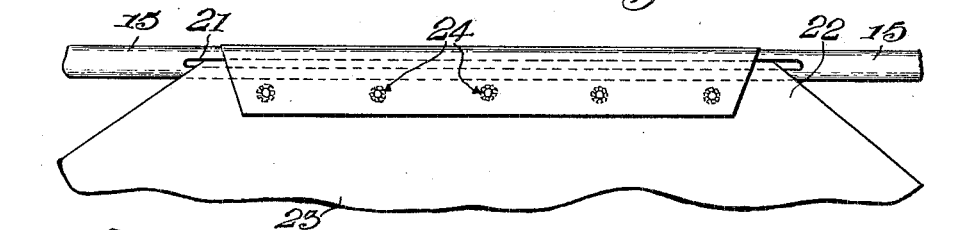
Figure 8 is a detail view illustrating the connection of one chart end with its associated chart shaft.

In order to change the set space displayed through the window opening 11, it is only necessary to turn the knob 20 in the proper direction. The chart as a whole is readily removable from the U-shaped mounting brackets and in order to remove the mounting unit to change a chart or otherwise inspect or repair the same, it is only necessary to grasp the end cap adjacent the knob 20 and pull the same longitudinally off the end of the holder. By thus removing the right hand cap, the mounting unit disclosed in detail in Figures 5 and 6 may be withdrawn bodily from the holder.

Figure 2:
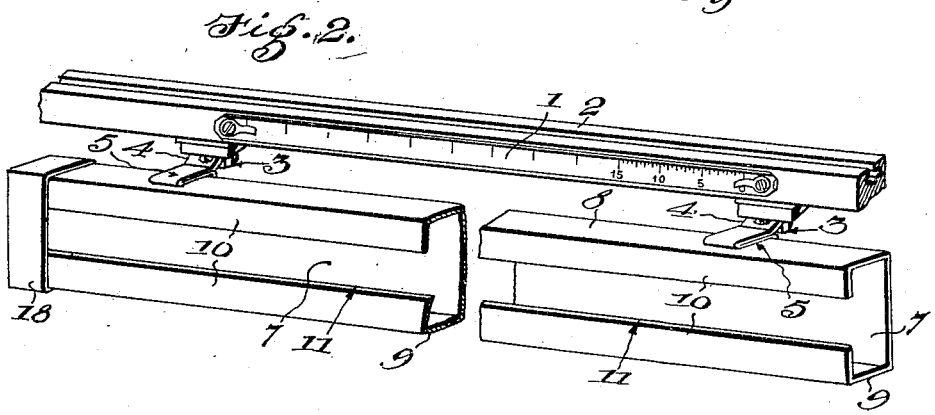
Figure 2 is a perspective view illustrating the casing and its mounting, parts being broken away and in section.

By forming the holder in the manner illustrated in Figures 2 and 3 of the drawings, a certain resiliency is imparted to the holder body by reason of the separation of the flanges 10 thus facilitating the snug removable reception of the mounting blocks 13.

It is of course to be understood that the details of structure and arrangements of parts may be variously changed and modified without departing from the spirit and scope of my invention.

I claim:—

1. A table chart mounting for a monotype machine wherein is provided a keyboard and an adjacent slide screw equipped em rack; said mounting comprising a longitudinal casing having a chart display window, means for mounting a chart in the casing in position for having a limited portion of its surface displayed through the window, means to move the chart to change the portion displayed through the window, and transverse brackets supporting the casing and having transversely disposed ears extended in angular relation to the casing and adapted to be secured by the slide screws of the em rack whereby to present the window in position to be viewed in convenient association with the keyboard.

2. A device of the character described comprising a casing having a longitudinal window therein, an end cap, and chart mounting means movable to change the portion of chart to be displayed through the window and removable from the casing as a unit together with said cap, said last named means including end blocks to snugly fit within the casing, chart carrying shafts rotatably mounted in the blocks, a driver shaft rotatably mounted in the blocks intermediately of said chart shafts and being gear connected with the chart shafts to cause them to rotate in like direction and extended through the end cap to permit manipulation from without the casing.

3. A device of the character described comprising a casing having a longitudinal window therein, an end cap, and chart mounting means movable to change the portion of chart to be displayed through the window, said last named means including end blocks to snugly fit within the casing, chart carrying shafts rotatably mounted in the blocks, a driver shaft rotatably mounted in the blocks intermediately of said chart shafts and being gear connected with the chart shafts to cause them to rotate in like direction and extended through the end cap to permit manipulation from without the casing.

4. A device of the character described comprising a casing having its main body bent up from a single sheet of metal to provide a bottom, rear and front side walls and inwardly directed top flanges terminating short of the longitudinal center to provide a longitudinal window, an end cap, and chart mounting means movable to change the portion of chart to be displayed through the window, said last named means including end blocks to snugly fit within the casing, chart carrying shafts rotatably mounted in the blocks, a driver shaft rotatably mounted in the blocks intermediately of said chart shafts and being gear connected with the chart shafts to cause them to rotate in like direction and extended through the end cap to permit manipulation from without the casing.

5. A table chart mounting for a monotype machine wherein is provided a keyboard and an adjacent slide screw equipped em rack; said mounting comprising a longitudinal casing having a flat face provided with a chart display window, means for mounting a chart in the casing in position for having a limited portion of its surface displayed through the window, means to move the chart to change the portion displayed through the window, and transverse brackets supporting the casing and having transversely disposed ears extended in angular relation to the casing and adapted to be secured by the slide screws of the em rack whereby to present the window equipped flat face substantially on a plane at right angles to the line of vision of the operator.

6. A device of the character described comprising a casing having a longitudinal window therein, an end cap, and chart mounting means movable to change the portion of chart to be displayed through the window and removable from the casing as a unit together with said cap, said last named means including end blocks to snugly fit within the casing, chart carrying shafts rotatably mounted in the blocks, a driver shaft rotatably mounted in the blocks intermediately of said chart shafts and being gear connected with the chart shafts to cause them to rotate in like direction and extended through the end cap to permit manipulation from without the casing, and U-shaped brackets to removably grip the casing and having extended ears to provide removable mounting for the device upon a suitable support.

7. A device of the character described comprising a casing having a longitudinal window therein, an end cap, and chart mounting means movable to change the portion of chart to be displayed through the window, said last named means including end blocks to snugly fit within the casing, chart carrying shafts rotatably mounted in the blocks, a driver shaft rotatably mounted in the blocks intermediately of said chart shafts and being gear connected with the chart shafts to cause them to rotate in like direction and extended through the end cap to permit manipulation from without the casing, said chart having a plurality of sets of indicia thereon each set being of a size to permit the display of no more than one complete set through the window at any given time.

In testimony whereof I hereunto affix my signature.

OTTO BLAHUT.